William Partridge's,
Improvement in Self Rakes for Reaping Machines.
No. 101156. Patented Mar. 22 1870.

Witnesses.
Jno. D. Patten
Edmund Masson

William Partridge by Mary A. Partridge Admx
A. B. Stoughton Attorney.

UNITED STATES PATENT OFFICE.

MARIE A. PARTRIDGE, OF PHILADELPHIA, PA., ADMINISTRATRIX OF THE ESTATE OF WILLIAM PARTRIDGE, DECEASED, ASSIGNOR TO WALTER A. WOOD MOWING AND REAPING MACHINE COMPANY.

IMPROVEMENT IN HARVESTER-RAKES.

Specification forming part of Letters Patent No. 101,156, dated March 22, 1870.

*To all whom it may concern:*

Be it known that WILLIAM PARTRIDGE, formerly of the city of Philadelphia, in the State of Pennsylvania, now deceased, did in his life-time invent certain new and useful Improvements in Self-Rakes for Reaping - Machines; and that the following is a full, clear, and exact description of the same, reference being had to the accompanying drawings, making a part of this specification, in which—

Figure 1:
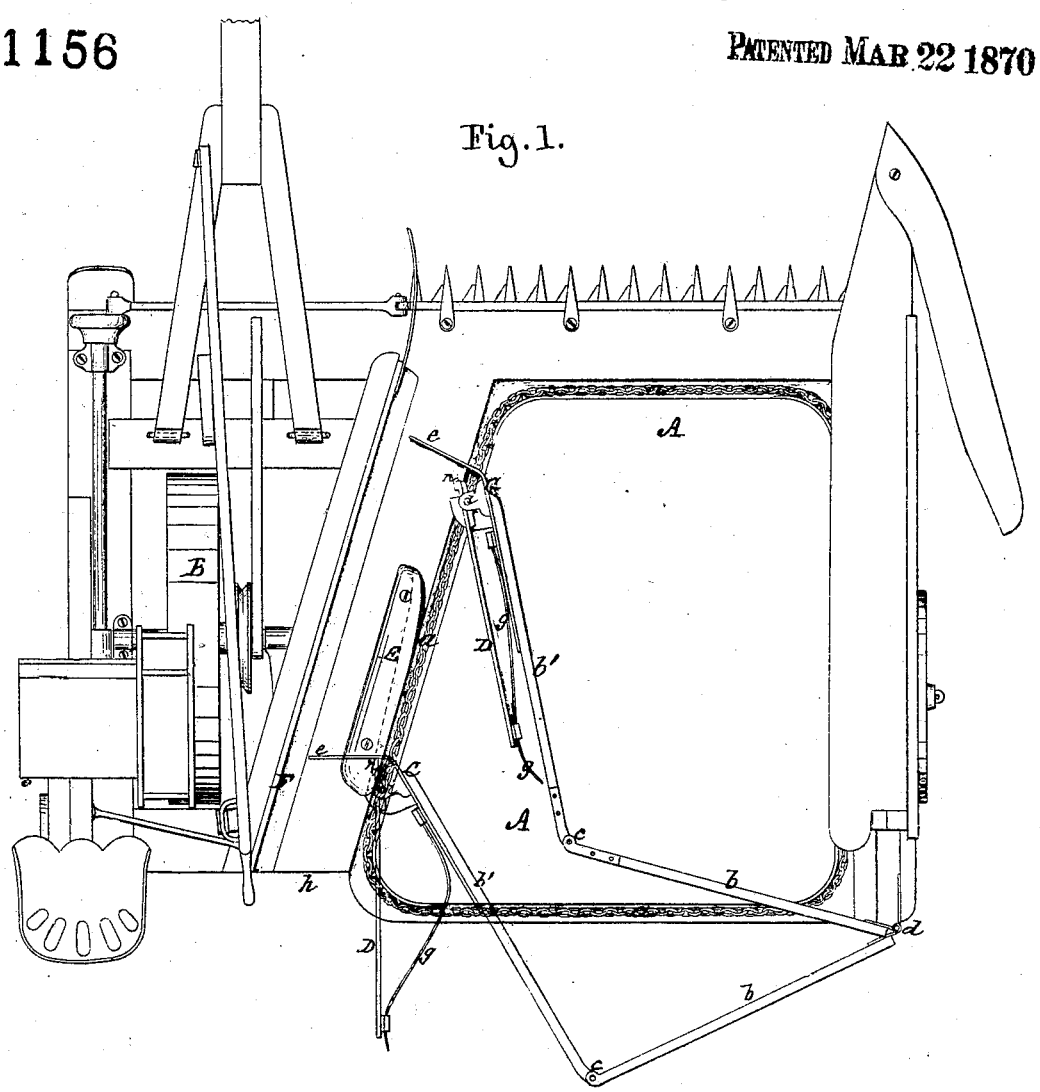
Figure 2:
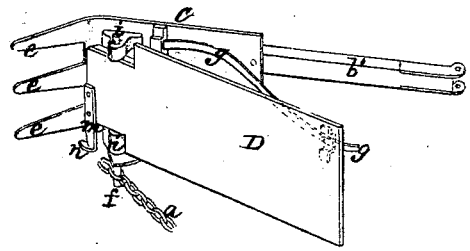

Figure 1 represents a top plan of a harvesting-machine with the self-rake attached. Fig. 2 represents, in perspective and detached from the machine, the rake, its wing, and the mechanism in part or in whole that operates the wing.

Similar letters of reference where they occur in the separate figures denote like parts of the rake or rake-operating parts in both of the drawings.

This invention consists in combining, with a rake for clearing the platform or grain-table of a reaping-machine of the cut grain and delivering the same in gavels upon the ground in rear of the machine and out of the way of the next round of the machine, a hinged wing and a mechanism for operating it, which, at the last of the sweeping or clearing operation, is thrown against the gathered grain, compressing it into a more compact form, and also aiding the rake to throw or deliver the gavel more toward the rear of the main frame, or farther from the platform, as will be described.

To enable others skilled in the art to make and use this invention, I will proceed to describe the same with reference to the drawings.

A represents a platform or grain-table of a reaping - machine, under which an endless chain, $a\ a\ a$, is caused to move around suitable pulleys by means of gearing connecting it with the main driving and supporting wheels B B of the machine.

$b\ b'$ is a rake-stale, jointed at $c$, and pivoted or hinged at $d$, around which point the part $b$ of the rake-stale moves as a center, while the other portion, $b'$, is free to move with the rake in the path in which it is carried by the chain $a$.

The rake C is formed like a palm or hand, with fingers $e$ upon it bent at an inclination with regard to its body, so as to catch into and move or carry off the cut grain; and a pin or stud, $f$, upon the rake is connected to the chain $a$, so that said rake shall follow the path of the chain around the margins of the platform.

A wing, D, is hinged to the rake, as at $i\ i$, and is held up close to the rake, until otherwise influenced, by a spring, $g$. Upon the rear portion of the wing D, and beyond or behind its pivoted or swinging portion or center $i$, there is a stud, $m$, with a projection, $n$, on its lower end.

On the platform A there is a ledge, E, with a groove or recess in it, into which the stud $m$ and its shouldered end $n$ take, and which forces the wing D away from the rake and toward the fence F, while it continues to move with the rake, and, as shown by the red lines in Fig. 1, until the stud $n$ leaves the groove in the ledge E, when the spring $g$ draws the wing close up to the rake again.

The moving of the grain by the wing D toward the fence F makes it more compact, and besides it delivers the gavel in its compact form farther from the platform, and more in rear of the main frame than the rake itself would do, because the latter, before it reaches the rear of the platform, has commenced to move away from the delivery-point, which is best at the part marked $h$.

As the rake and wing have considerable motion when the machine is in operation, and as the wing is moved toward the grain with considerable impulse, the tendency is to throw the gavel from the platform with sufficient force to drop it entirely beyond the path of the machine on its next round.

What is claimed herein as the invention of WILLIAM PARTRIDGE is—

In combination with a self-rake for clearing the platform of a harvesting-machine, and a wing hinged thereto for compressing the gavel and throwing it farther from the platform and more in rear of the main frame, the ledge E on the platform and the stud $m$ and spring $g$ on the wing, for operating said wing, substantially as described.

MARIE A. PARTRIDGE,
*Administratrix of William Partridge, deceased.*

Witnesses:
EDW. H. WILLIAMSON,
A. T. SKINNER.